US012675699B2

(12) United States Patent　　　　(10) Patent No.:　US 12,675,699 B2
Guo et al.　　　　　　　　　　　　(45) Date of Patent:　Jul. 7, 2026

(54) LEARNING ENVIRONMENT REPRESENTATIONS FOR AGENT CONTROL USING PREDICTIONS OF BOOTSTRAPPED LATENTS

(71) Applicant: GPM Holding LLC, Mountain View, CA (US)

(72) Inventors: Zhaohan Guo, London (GB); Mohammad Gheshlaghi Azar, London (GB); Bernardo Avila Pires, London (GB); Florent Altché, Paris (FR); Jean-Bastien François Laurent Grill, Paris (FR); Bilal Piot, London (GB); Remi Munos, London (GB)

(73) Assignee: GDM Holding LLC, Mountain View, CA (US)

( * ) Notice: Subject to any disclaimer, the term of this patent is extended or adjusted under 35 U.S.C. 154(b) by 980 days.

(21) Appl. No.: 17/797,886

(22) PCT Filed: Feb. 8, 2021

(86) PCT No.: PCT/EP2021/052987
§ 371 (c)(1),
(2) Date: Aug. 5, 2022

(87) PCT Pub. No.: WO2021/156517
PCT Pub. Date: Aug. 12, 2021

(65) Prior Publication Data
US 2023/0083486 A1　　Mar. 16, 2023

Related U.S. Application Data

(60) Provisional application No. 62/971,209, filed on Feb. 6, 2020.

(51) Int. Cl.
　　*G06N 3/084*　　(2023.01)
　　*G06N 3/044*　　(2023.01)
　　*G06N 3/045*　　(2023.01)
(52) U.S. Cl.
　　CPC ............. *G06N 3/084* (2013.01); *G06N 3/044* (2023.01); *G06N 3/045* (2023.01)
(58) Field of Classification Search
　　CPC ........ G06N 3/084; G06N 3/044; G06N 3/045; G06N 7/01; G06N 3/006; G06N 3/092
　　See application file for complete search history.

(56) References Cited

U.S. PATENT DOCUMENTS

2009/0319517 A1　12/2009　Guha et al.
2012/0059708 A1　3/2012　Galas et al.
(Continued)

FOREIGN PATENT DOCUMENTS

CN　　109923560 A　　6/2019
CN　　110088774 A　　8/2019
(Continued)

OTHER PUBLICATIONS

Office Action in European Appln. No. 21704484.1, dated Nov. 17, 2023, 10 pages.
(Continued)

*Primary Examiner* — Abdullah Al Kawsar
*Assistant Examiner* — Gisel Gabriela Faccenda
(74) *Attorney, Agent, or Firm* — Fish & Richardson P.C.

(57) ABSTRACT
Methods, systems, and apparatus, including computer programs encoded on a computer storage medium, for training an environment representation neural network of a reinforcement learning system controls an agent to perform a given task. In one aspect, the method includes: receiving a current observation input and a future observation input; generating, from the future observation input, a future latent
(Continued)

representation of the future state of the environment; processing, using the environment representation neural network, to generate a current internal representation of the current state of the environment; generating, from the current internal representation, a predicted future latent representation; evaluating an objective function measuring a difference between the future latent representation and the predicted future latent representation; and determining, based on a determined gradient of the objective function, an update to the current values of the environment representation parameters.

20 Claims, 6 Drawing Sheets

(56) References Cited

U.S. PATENT DOCUMENTS

| | | | |
|---|---|---|---|
| 2017/0357985 A1 | 12/2017 | Zinn et al. | |
| 2018/0260414 A1* | 9/2018 | Gordo Soldevila | .. G06F 16/532 |
| 2019/0354859 A1 | 11/2019 | Xu et al. | |

FOREIGN PATENT DOCUMENTS

| | | | |
|---|---|---|---|
| WO | WO 2018083532 | 5/2018 | |
| WO | WO-2018224471 A1 * | 12/2018 | ............. G06N 3/092 |

OTHER PUBLICATIONS

Office Action in European Appln. No. 21704484.1, mailed on Feb. 5, 2025, 14 pages.

Abadi et al., "Tensorflow: Large-scale machine learning on heterogeneous distributed systems." Submitted on Mar. 2016, arXiv:1603.04467v2, 19 pages.

Amos et al., "Learning awareness models." Submitted on Apr. 2018, arXiv:1804.06318v1, 19 pages.

Aytar et al., "Playing hard exploration games by watching youtube." Advances in neural information processing systems 31, 2018, 12 pages.

Azar et al., "World discovery models" Submitted on Mar. 2019, arXiv:1902.07685v3, 18 pages.

Badia et al., "Never give up: Learning directed exploration strategies." Submitted on Feb. 2020, arXiv:2002.06038v1, 28 pages.

Beattie et al., "Deepmind lab." Submitted on Dec. 2016, arXiv:1612.03801v2, 11 pages.

Bellemare et al., "The arcade learning environment: An evaluation platform for general agents." Journal of Artificial Intelligence Research 47, Jun. 2013, 253-279.

Brunskill et al., "Sample complexity of multi-task reinforcement learning." Submitted on Sep. 2013, arXiv:1309.6821, 10 pages.

Burda et al., "Exploration by random network distillation." Submitted on Oct. 2018, arXiv:1810.12894v1, 17 pages.

Cassandra et al., "Acting optimally in partially observable stochastic domains." Aaai. vol. 94, Apr. 1994, 6 pages.

Espeholt et al., "Impala: Scalable distributed deep-rl with importance weighted actor-learner architectures." International conference on machine learning. PMLR, Jul. 2018, 10 pages.

Gregor et al., "Draw: A recurrent neural network for image generation." International conference on machine learning. PMLR, Jun. 2015, 10 pages.

Gregor et al., "Shaping belief states with generative environment models for rl." Advances in Neural Information Processing Systems 32, 2019, 13 pages.

Guo et al., "Neural predictive belief representations." Submitted on Aug. 2019, arXiv:1811.06407v2, 15 pages.

Ha et al., "Recurrent world models facilitate policy evolution." Advances in neural information processing systems 31, 2018, 13 pages.

Hafner et al., "Learning latent dynamics for planning from pixels." International conference on machine learning. PMLR, May 2019, 11 pages.

He et al., "Deep residual learning for image recognition." Proceedings of the IEEE conference on computer vision and pattern recognition. 2016, 9 pages.

He et al., "Identity mappings in deep residual networks." Submitted on Jul. 2016, arXiv:1603.05027v3, 15 pages.

Hessel et al., "Multi-task deep reinforcement learning with popart." Proceedings of the AAAI Conference on Artificial Intelligence. vol. 33. No, 1, Jul. 2019, 8 pages.

Hochreiter et al., "Long short-term memory." Neural computation 9.8, Nov. 1997, 1735-1780.

International Preliminary Report on Patentability in International Appln. No. PCT/EP2021/052987, mailed on Aug. 18, 2022, 8 pages.

International Search Report and Written Opinion in International Appln. No. PCT/EP2021/052987, mailed on Jun. 2, 2021, 15 pages.

Jaderberg et al., "Reinforcement learning with unsupervised auxiliary tasks." Submitted on Nov. 2016, arXiv:1611.05397v1, 14 pages.

Jeong et al., "Self-supervised sim-to-real adaptation for visual robotic manipulation." Submitted on Oct. 2019, arXiv:1910.09470v1, 7 pages.

Levine et al., "End-to-end training of deep visuomotor policies." The Journal of Machine Learning Research 17.1, Jan. 2016, 40 pages.

Littman et al., "Predictive representations of state." Advances in neural information processing systems 14, 2001, 14 pages.

Mirowski et al., "Learning to navigate in complex environments" Submitted on Jan. 2017, arXiv:1611.03673v3, 16 pages.

Mnih et al., "Asynchronous methods for deep reinforcement learning." International conference on machine learning. PMLR, Jun. 2016, 10 pages.

Mnih et al., "Human-level control through deep reinforcement learning." nature 518.7540, Feb. 2015, 529-533.

Moreno et al., "Neural belief states for partially observed domains." NeurIPS 2018 workshop on reinforcement learning under partial observability, 2018, 5 pages.

Nair et al., "Rectified linear units improve restricted boltzmann machines." Proceedings of the 27th international conference on machine learning (ICML-10), 2010, 8 pages.

Oh et al., "Action-conditional video prediction using deep networks in atari games." Advances in neural information processing systems 28, 2015, 9 pages.

Oh et al., "Value prediction network." Advances in neural information processing systems 30, 2017, 11 pages.

Oord et al., "Representation learning with contrastive predictive coding" Submitted on Jan. 2019, arXiv:1807.03748v2, 13 pages.

Pathak et al., "Curiosity-driven exploration by self-supervised prediction." International conference on machine learning. PMLR, Jul. 2017, 10 pages.

Silver et al., "A general reinforcement learning algorithm that masters chess, shogi, and Go through self-play." Science 362.6419, Dec. 2018, 32 pages.

Silver et al., "Mastering the game of go without human knowledge." nature 550.7676, Oct. 2017, 42 pages.

Singh et al., "Learning predictive state representations." Proceedings of the 20th International Conference on Machine Learning (ICML-03), 2003, 712-719.

Sodhani et al., "Learning powerful policies by using consistent dynamics model." Submitted on Jun. 2019, arXiv:1906.04355v1, 14 pages.

Song et al., "V-mpo: On-policy maximum a posteriori policy optimization for discrete and continuous control." Submitted on Sep. 2019, arXiv:1909.12238v1, 19 pages.

Sutton et al., "Reinforcement learning: An introduction." MIT press, 2018, 398 pages.

Szepesvári, "Algorithms for reinforcement learning" Synthesis lectures on artificial intelligence and machine learning, 4(1):1-103, Jun. 2009, 98 pages.

Tassa et al., "DeepMind control suit" Submitted on Jan. 2018, arXiv:1801.00690v1, 24 pages.

(56)    References Cited

OTHER PUBLICATIONS

Vinyals et al., "Grandmaster level in StarCraft II using multi-agent reinforcement learning." Nature 575.7782, Nov. 2019, 350-354.
Zhang et al., "Solar: Deep structured representations for model-based reinforcement learning." International conference on machine learning. PMLR, May 2019, 10 pages.
Decision to Grant Patent in Japanese Appln. No. 2022-548007, dated Aug. 21, 2023, 5 pages (with English translation).
Office Action in Canadian Appln. No. 3,167,197, dated Oct. 3, 2023, 5 pages.
Office Action in Chinese Appln. No. 202180020853, mailed May 1, 2025, 20 pages.
Office Action in Korean Appln. No. 10-2022-7030053, mailed on Aug. 12, 2025, 20 pages (with English translation).
Office Action in European Appln. No. 21704484.1, mailed on Aug. 19, 2025, 11 pages.
Office Action in European Appln. No. 23724481.9, mailed on Oct. 8, 2025, 13 pages.

* cited by examiner

200

```
┌─────────────────────────────────────────────┐
│ Receive (i) a current observation input and  │ ⌐202
│ (ii) a future observation input              │
└─────────────────────────────────────────────┘
                      │
                      ▼
┌─────────────────────────────────────────────┐
│ Generate, from the future observation input, │ ⌐204
│ a future latent representation               │
└─────────────────────────────────────────────┘
                      │
                      ▼
┌─────────────────────────────────────────────┐
│ Process the current observation input to     │ ⌐206
│ generate a current internal representation   │
└─────────────────────────────────────────────┘
                      │
                      ▼
┌─────────────────────────────────────────────┐
│ Generate, from the current internal          │ ⌐208
│ representation, a predicted future latent    │
│ representation                               │
└─────────────────────────────────────────────┘
                      │
                      ▼
┌─────────────────────────────────────────────┐
│ Evaluate an objective function measuring a   │ ⌐210
│ difference between the future latent         │
│ representation and the predicted future      │
│ latent representation                        │
└─────────────────────────────────────────────┘
                      │
                      ▼
┌─────────────────────────────────────────────┐
│ Determine, based on a determined gradient of │ ⌐212
│ the objective function, an update to the     │
│ current values of the environment            │
│ representation parameters                    │
└─────────────────────────────────────────────┘
```

Process the future observation input to generate a future internal representation — 502

Generate, from the future internal representation, a predicted future internal representation — 504

Determine an update to current values of the latent embedding network parameters — 506

LEARNING ENVIRONMENT REPRESENTATIONS FOR AGENT CONTROL USING PREDICTIONS OF BOOTSTRAPPED LATENTS

CROSS-REFERENCE TO RELATED APPLICATION

This application is a National Stage Application under 35 U.S.C. § 371 and claims the benefit of International Application No. PCT/EP2021/052987, filed Feb. 8, 2021, which claims priority to U.S. Provisional Application No. 62/971,209, filed on Feb. 6, 2020. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that trains a neural network system to control an agent interacting with an environment. The neural network system includes an environment representation neural network that is configured to process, at each time step, an environment representation network input including a current observation that characterizes a current state of the environment to generate an internal representation of the current observation. The neural network system also includes an action selection policy neural network that is configured to process the internal representation to generate an action selection output that can be used to select an action to be performed by the agent in response to the current observation.

To improve training of the neural network system, during this training, reinforcement learning system trains the neural network system together with multiple auxiliary neural networks on auxiliary prediction training tasks, i.e., in addition to reinforcement learning training of the neural network system. In some implementations, the auxiliary neural networks can include (i) a partial representation neural network, (ii) a forward prediction neural network, (iii) a backward prediction neural network, and (iv) a latent representation neural network.

In particular, the reinforcement learning system can train the environment representation neural network to generate, from the environment representation network input including ing the current observation, a predictive internal representation, i.e., an internal representation of the given observation that is predictive of internal representations generated by the environment representation neural network from one or more other observations that are after the given observation in a sequence of observations.

According to an aspect, there is provided a method of training an environment representation neural network that has a plurality of environment representation parameters and that receives an input comprising an observation characterizing a state of an environment being interacted with by an agent and generates an internal representation of the state of the environment, wherein the internal representation is used to control the agent in response to the observation. The training method comprises receiving (i) a current observation input comprising a current observation characterizing a current state of the environment and (ii) a future observation input comprising a future observation characterizing a future state of the environment that is subsequent to the current state. The method further comprises generating, from the future observation input, a future latent representation of the future state of the environment. The method also comprises processing, using the environment representation neural network, the current observation input in accordance with current values of the environment representation parameters to generate a current internal representation of the current state of the environment. The method additionally comprises generating, from the current internal representation, a predicted future latent representation that is a prediction of the future latent representation of the future state of the environment. The method further comprises evaluating an objective function measuring a difference between the future latent representation and the predicted future latent representation; and determining, based on a determined gradient of the objective function, an update to the current values of the environment representation parameters. The objective function may be separate to the objective function used for training the overall reinforcement learning system.

Generating the future latent representation may comprise: processing, using a latent embedding neural network having a plurality of latent embedding network parameters, the future observation to generate the future latent representation.

The current and future observation inputs may be part of a trajectory used for training the environment representation neural network. The trajectory may be selected from a memory and the trajectory may include a sequence of observations each associated with an action performed by the agent (or another agent) in response to the observation of the environment (or another instance of the environment) and, in some cases, a reward received by the agent. Thus, the current observation input may be an observation at a current time step in the trajectory and the future observation input may be an observation in the trajectory that occurs at the subsequent time step in the trajectory with respect to the current time step being processed.

The method may further comprise processing, using the environment representation neural network and in accordance with current values of the environment representation parameters, the future observation input to generate a future internal representation of the future state of the environment; generating, from the future latent representation, a predicted future internal representation that is a prediction of the future internal representation of the future state of the environment; and determining, based on a difference between the future internal representation and the predicted future internal representation, an update to current values of the latent embedding network parameters.

The agent may be controlled using a fixed, uniformly random action selection policy.

The method may further comprise processing the current internal representation using an action selection policy neural network having a plurality of policy parameters to generate a current action selection output specifying an action to be performed by the agent at the current state; determining, based on the current action selection output, a reinforcement learning loss; and determining, based on the reinforcement loss, an update to current values of the policy parameters.

The method may further comprise determining an update to the current values of the environment representation parameters by backpropagating a gradient of the reinforcement learning loss into the environment representation neural network.

The future state may be k steps after the current state, and wherein k is a predetermined positive integer.

Generating the predicted future latent representation that is a prediction of the future latent representation of the future state of the environment may comprise processing, using a forward prediction neural network, a forward prediction network input that is derived from the current internal representation to generate the predicted future latent representations. The method may further comprise determining, based on computing a gradient of the objective function with respect to the forward prediction network parameters, an update to current values to the forward prediction network parameters.

Generating the predicted future internal representation may comprise processing, using a backward prediction neural network having a plurality of backward prediction network parameters, the future latent representation to generate the predicted future internal representation. The method may further comprise determining an update to current values of the backward prediction network parameters.

The current observation input may further comprise a preceding action that was performed by the agent at a preceding state of the environment.

The environment representation neural network may comprise a partial representation neural network that is configured to process (i) the current internal representation and (ii) a current action that is performed by the agent to generate a partial future internal representation of the future state of the environment.

The forward prediction network input that is derived from the current internal representation may be the partial future internal representation generated by the partial representation neural network.

The method may further comprise backpropagating the computed gradient into the environment representation neural network to determine the update to the current values of the environment representation parameters.

According to another aspect, there is provided a system comprising one or more computers and one or more storage devices storing instructions that are operable, when executed by the one or more computers, to cause the one or more computers to perform the operations of the respective method described above.

According to a further aspect, there is provided a computer storage medium encoded with instructions that, when executed by one or more computers, cause the one or more computers to perform the operations of the respective method described above.

Particular embodiments of the subject matter described in this specification can be implemented so as to realize one or more of the following advantages.

The reinforcement learning system described in this specification can train an environment representation neural network to learn to generate high-quality internal representations of states of the environment. In various cases, such internal representations can incorporate information from multiple observation modalities, including, for example, rewards, pixel images, language instructions, and other sensory inputs such as touch, smell, sound, and temperature.

The described reinforcement learning system encourages the environment representation neural network to learn to generate more informative or predictive internal representations by performing the reinforcement learning training in conjunction with one or more other auxiliary neural networks that are configured to perform auxiliary tasks, including, for example, generating latent representations of environments, forward prediction of future states, and backward prediction of past states.

In contrast, training environment representation neural networks by conventional methods is less effective when the training does not involve auxiliary tasks and focuses on generating respective internal representations for current (i.e., immediate) states of the environment, or when the training is based on conventional auxiliary tasks, including, for example, pixel or feature control tasks for a particular observation. In particular, this is because the reinforcement learning training system as described in this specification adopts auxiliary tasks that generally require the internal representations to be predictive of future states in a latent space, while in turn requiring those latent representations to be predictive of representations of the future states.

By making use of the trained environment representation neural network to generate such useful representations of respective states of an environment, the reinforcement learning system described in this specification can augment the signals to be provided to the action selection policy neural network to improve the quality of the action selection outputs, either during training or after training, i.e., at run time. The reinforcement learning system described in this specification can thus achieve superior performance to conventional reinforcement learning systems in controlling the agent to perform a task, for example by receiving more cumulative extrinsic reward.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for training on a forward prediction task.

Like reference numbers and designations in the various drawings indicate like elements.

DETAILED DESCRIPTION

Figure 1:
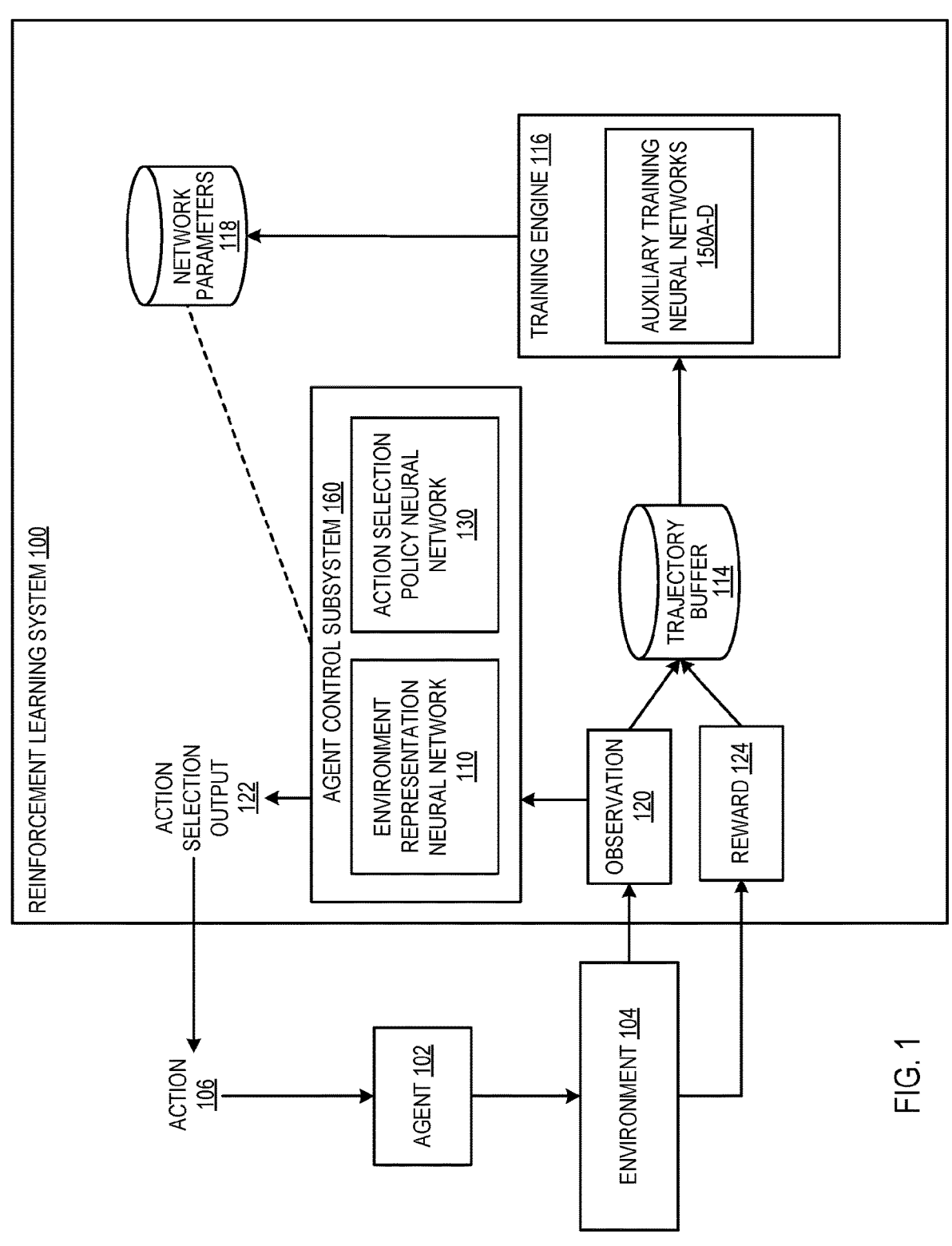
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some implementations the environment is a simulated environment and the agent is implemented as one or more computers interacting with the simulated environment. Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

In a further example the environment may be a chemical synthesis or a protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

In some applications the agent may be a static or mobile software agent i.e. a computer programs configured to operate autonomously and/or with other software agents or people to perform a task. For example the environment may be an integrated circuit routing environment and the system may be configured to learn to perform a routing task for routing interconnection lines of an integrated circuit such as an ASIC. The rewards (or costs) may then be dependent on one or more routing metrics such as an interconnect resistance, capacitance, impedance, loss, speed or propagation delay, physical line parameters such as width, thickness or geometry, and design rules. The observations may be observations of component positions and interconnections; the actions may comprise component placing actions e.g. to define a component position or orientation and/or interconnect routing actions e.g. interconnect selection and/or placement actions. The routing task may thus comprise placing components i.e. determining positions and/or orientations of components of the integrated circuit, and/or determining a routing of interconnections between the components. Once the routing task has been completed an integrated circuit, e.g. ASIC, may be fabricated according to the determined placement and/or routing. Or the environment may be a data packet communications network environment, and the agent be a router to route packets of data over the communications network based on observations of the network.

Generally, in the case of a simulated environment, the observations may include simulated versions of one or more of the previously described observations or types of observations and the actions may include simulated versions of one or more of the previously described actions or types of actions.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

In general, in the above described applications, where the environment is a simulated version of a real-world environment, once the system/method has been trained in the simulation it may afterwards be applied to the real-world environment. That is, control signals generated by the system/method may be used to control the agent to perform a task in the real-world environment in response to observations from the real-world environment. Optionally the system/method may continue training in the real-world environment based on one or more rewards from the real-world environment.

In some above implementations, at each time step, the system receives a reward based on the current state of the environment and the action of the agent at the time step. For example, the system may receive a reward for a given time step based on progress toward the agent accomplishing one or more goals. For example, a goal of the agent may be to navigate to a goal location in the environment, and the reward may be specified by a scalar numerical value that characterizes the agent's progress toward approaching the goal location.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 controls an agent 102 interacting with an environment 104 by selecting actions 106 to be performed by the agent 102 and then causing the agent 102 to perform the selected actions 106.

Performance of the selected actions 106 by the agent 102 generally causes the environment 104 to transition into new states. By repeatedly causing the agent 102 to act in the environment 104, the system 100 can control the agent 102 to complete a specified task.

The reinforcement learning system 100 includes an agent control subsystem 160, which in turn includes an environment representation neural network 110, an action selection policy neural network 130, and, in some implementations, a value prediction neural network. The reinforcement learning system 100 also includes a training engine 116, and one or more memories storing a set of network parameters 118 of the neural networks included in the agent control subsystem 160 and, as will be described further below, the auxiliary neural networks 150A-D that are maintained by the training engine 116 during training to improve the training of the neural networks included in the agent control subsystem 160.

At each of multiple time steps, the environment representation neural network 110 is configured to process an environment representation network input that includes (i) a current observation that characterizes a current state of the environment and (ii) a preceding action performed by the agent in response to a preceding observation in accordance with the network parameters 118 to generate an internal representation of the current observation. The current observation may however be considered as optionally including the preceding action. The action selection policy neural network 130 is then configured to process the internal representation in accordance with the parameters 118 of the action selection policy neural network 130 ("policy parameters") to generate an action selection output 122.

The system 100 uses the action selection output 122 to control the agent, i.e., to select the action 106 to be performed by the agent at the current time step in accordance with an action selection policy and then cause the agent to perform the action 106, e.g., by directly transmitting control signals to the agent or by transmitting data identifying the action 106 to a control system for the agent.

A few examples of using the action selection output 122 to select the action 106 to be performed by the agent are described next.

In one example, the action selection output 122 defines a probability distribution over possible actions to be performed by the agent. For example, the action selection output can include a respective action probability for each action in a set of possible actions that can be performed by the agent to interact with the environment. In another example, the action selection output 122 can include parameters of a distribution over the set of possible actions. The system 100 can select the action to be performed by the agent based on the action selection output 122 using any of a variety of action selection policies, e.g., by sampling an action in accordance with the probability values for the actions, or by selecting the action with the highest probability value.

In another example, the action selection output 122 identifies an optimal action from the set of possible actions to be performed by the agent in response to the observation. For example, in the case of controlling a mechanical agent, the action selection output can identify torques to be applied to one or more joints of the mechanical agent. The system 100 can select the action to be performed by the agent based on the action selection output 122 using any of a variety of action selection policies, e.g., by selecting the identified optimal action or by adding noise to the optimal action to encourage exploration and selecting the noise-added action.

In another example, the action selection output 122 may include a respective Q-value for each action in the set of possible actions that can be performed by the agent.

The Q value for an action is an estimate of a "return" that would result from the agent performing the action in response to the current observation 120 and thereafter selecting future actions performed by the agent 102 in accordance with current values of the control neural network parameters.

A return refers to a cumulative measure of "rewards" 124 received by the agent, for example, a time-discounted sum of rewards.

The agent can receive a respective reward 124 at each time step, where the reward 124 is specified by a scalar numerical value and characterizes, e.g., a progress of the agent towards completing a specified task.

In this example, the system 100 can select the action to be performed by the agent based on the action selection output 122 using any of a variety of action selection policies, e.g., by selecting the action with the highest Q value or by mapping the Q values to probabilities and sampling an action in accordance with the probabilities. In some cases, the system 100 can select the action to be performed by the agent in accordance with an exploration policy. For example, the exploration policy may be an $\in$-greedy exploration policy, where the system 100 selects the action to be performed by the agent in accordance with the action selection output 122 with probability $1-\in$, and randomly selects the action with probability $\in$. In this example, $\in$ is a scalar value between 0 and 1.

In some implementations, in addition to any of the above, the agent control subsystem 160 also includes a value prediction neural network that is configured to process, at each of the multiple time steps, the internal representation generated by the environment representation neural network 110 and to generate a value prediction that represents a value of the environment being in the current state to successfully performing the specified task. In other words, the value prediction is an estimate of the return for the specified task resulting from the environment being in the current state characterized by the observation, e.g., an estimate of the time discounted sum of rewards 124 that will be received starting from the current state over the remainder of the task episode or over some fixed number of future time steps if the agent is controlled using the agent control subsystem 160. The sum is referred to as time discounted because future rewards are discounted by a fixed time discount factor $\gamma$ when computing the return.

In some implementations, the environment representation neural network 110 is a recurrent neural network that has been configured to receive, at each time of the multiple time steps, an environment representation network input including (i) a current observation 120 characterizing a current state of the environment and (ii) a preceding action 106 performed by the agent in response to a preceding observation, to update the current hidden state of the environment representation neural network 110 by processing the received environment representation network input, i.e., to modify the current hidden state of the network 110 that has been generated by processing previous inputs by processing the current received input. The updated hidden state of the environment representation neural network 110 corresponds to an internal representation of the current state of the environment 104. For example, the architecture of the environment representation neural network 110 may include a sequence of one or more layers (e.g., convolutional layers, fully-connected layers or embedding layers), followed by one or more recurrent layers (e.g., long short-term memory (LSTM) layers) and, in some cases, an output layer that applies a transformation to the hidden states generated by the recurrent layers to generate an environment representation network output.

As used in this specification, a hidden state, an internal representation, or a latent representation generally refers to intermediate data generated by a neural network from an input observation, data derived from the input observation, or both and can each be represented as an ordered collection of numerical values, e.g., a vector or matrix of numerical values. Each such intermediate data can have a lower dimensionality than the observation itself.

In these implementations, the action selection policy neural network 130 and, when included, the value prediction neural network are arranged on top of the environment representation neural network 110 such that they can each receive the internal representations generated by the environment representation neural network 110 and to generate the action selection outputs and value prediction outputs, respectively. For example, the hidden states generated by the recurrent layers (e.g., long short-term memory (LSTM) layers) of the environment representation neural network 110 can be directly provided, e.g., as intermediate outputs of the environment representation neural network 110, to respective input layers of the action selection policy neural network 130 and the value prediction neural network. As another example, the environment representation network outputs generated by the output layer of the environment representation neural network 110 from the hidden states can be provided to the respective input layers of the action selection policy neural network 130 and the value prediction neural network.

The action selection policy neural network 130 and the value prediction neural network can each be implemented as a respective neural network with any appropriate neural network architecture that enables it to perform its described function, e.g., a multi-layer perceptron neural network architecture.

The training engine 116 in the reinforcement learning system 100 trains the networks included in the agent control subsystem 160 to generate action selection outputs that maximize the expected long-term time-discounted reward received by the system 100, by using a reinforcement learning technique to iteratively adjust the values of the network parameters 118.

For one or more time steps, the system 100 stores the interaction between the agent 102 (or another agent) and the environment 104 (or another instance of the environment) for the time step in a trajectory buffer 114. The trajectory buffer 114 thus maintains data specifying multiple sequences of observations each associated with an action performed by the agent in response to the observation of the environment, and, in some cases, a reward received by the agent. In some implementations, during trajectory data collection, the agent interacting with the environment can be controlled using a fixed, uniformly random action selection policy. In other implementations, the agent can be controlled using the agent control subsystem 160 in accordance with current values of the set of parameters 118 of the neural networks included in the agent control subsystem 160.

In some implementations, the training engine 116 trains the environment representation neural network 110, the action selection policy neural network 130, or both using an on-policy reinforcement learning technique and based on trajectories as they are generated. An example method for on-policy reinforcement learning is described in Volodymyr Mnih et. al., "Asynchronous methods for deep reinforcement learning," Proceedings of the 33rd International Conference on Machine Learning, 2016. Another example method for on-policy reinforcement learning is a policy gradient method. In some other implementations, the training engine 116 trains the environment representation neural network 110, the action selection policy neural network 130, or both using an off-policy reinforcement learning technique, for example one-step or n-step Q-learning, based on trajectory data as they are generated or that a sampling engine samples from the trajectory buffer 114.

In addition to training the environment representation neural network 110 and the action selection policy neural network 130 included in the agent control subsystem 160 to maximize the expected long-term time-discounted reward, the system 100 may train the neural network 110 or 130 or both by additionally training multiple auxiliary training neural networks 150A-D on auxiliary prediction training tasks, i.e., in addition to reinforcement learning training of the neural networks.

Specifically, the auxiliary training neural networks may include (i) a partial representation neural network, (ii) a forward prediction neural network, (iii) a backward prediction neural network, and (iv) a latent representation neural network. And the auxiliary prediction training tasks may include (i) a forward, action-conditional prediction task to generate a predicted future latent representation of a future state of the environment from a current observation of a current state of the environment, and (ii) a reverse prediction task to generate a predicted future internal representation from a future observation of the future state of the environment.

The training engine 116 can do this by optimizing a set of auxiliary task objective functions to iteratively update current values of the set of parameters 118 of the auxiliary neural networks 150A-D, and to further update current values of the set of parameters 118 of the environment representation neural network 110 and the action selection policy neural network 130.

Each auxiliary neural network can have an appropriate neural network architecture that enables it to perform its described function. Each auxiliary control neural network has a respective set of parameters. For example, the partial representation neural network may be configured as a recurrent neural network, e.g., a LSTM neural network. As another example, the forward and backward prediction neural networks may each be configured as a respective feedforward neural network, and latent embedding neural network may be configured as a convolutional neural network, i.e., a neural network with one or more convolutional network layers.

By training the environment representation neural network 110 and, optionally, the action selection policy neural network 130 together with the auxiliary neural networks 150A-D to generate predicted future latent representations from current observations (in the forward prediction training) and to generate predicted future internal representations from future observations (in the backward prediction training), the reinforcement learning system 100 can determine trained values for the set of parameters 118 that ensure that the environment representation neural network 110 generates a meaningful and predictive internal representation, i.e., internal representation of a given observation that is predictive of internal representations generated by the environment representation neural network from one or more other observations that are after the given observation in a sequence of observations. Such predictive internal representations in turn facilitate the generation of more effective policy outputs by the action selection policy neural network 130, and therefore more closely match with the long-term goals of the agent 102 to maximize the expected long-term time-discounted rewards.

Training the neural networks using a reinforcement learning training technique in addition to a self-supervised representation learning technique on the auxiliary prediction training tasks will be described in more detail below.

FIG. 2 is a flow diagram of an example process 200 for training on a forward prediction task. For convenience, the process 200 will be described as being performed by a system of one or more computers located in one or more locations. For example, a reinforcement learning system, e.g., the reinforcement learning system 100 of FIG. 1, appropriately programmed, can perform the process 200.

In general, the system can perform the process 200 by using a trajectory selected from the replay memory. For example, the trajectory can be one of a batch of trajectories sampled from the replay memory. The trajectory can include a sequence of observations each associated with an action performed by the agent (or another agent) in response to the observation of the environment (or another instance of the environment) and, in some cases, a reward received by the agent. In particular, the system can repeatedly perform the process 200 for different future observations that are of different time steps ahead of a given observation (referred to as the "current" observation below) in the selected trajectory. For example, the system can perform one iteration of the process 200 for each observation that is after the current observation in sequence of observations in the selected trajectory.

The system receives a current observation input and a future observation input (202).

The current observation input can include (i) a current observation characterizing a current state of the environment and (ii) a preceding action that was performed by the agent at a preceding state of the environment that immediately precedes the current state. The future observation input can include (i) a future observation characterizing a future state of the environment that is one or more steps after the current state and (ii) a preceding action that was performed by the agent at a preceding state of the environment that immediately precedes the future state. In some cases, the observation can include visual data, e.g., an image or a video frame. In other cases, the observation can be multimodal observations that additionally incorporate information about text, e.g., natural language instructions, rewards, or other sensory inputs including touch, smell, sound, or temperature.

Figure 3:
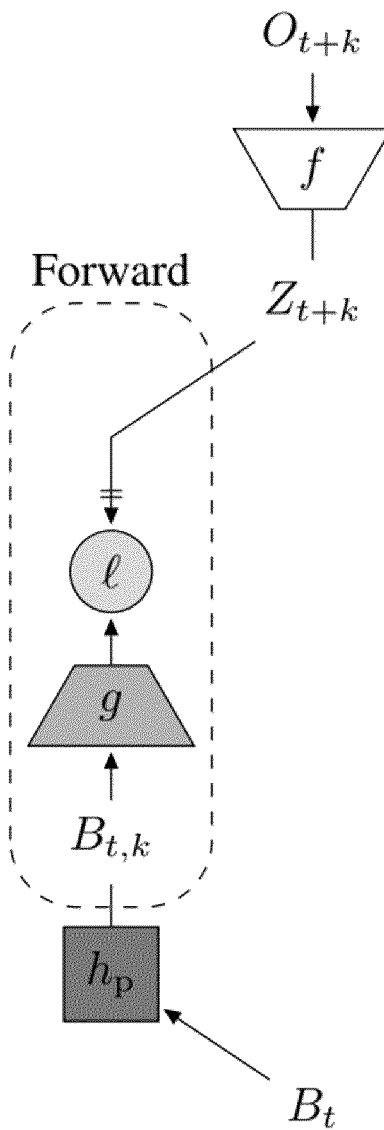
FIG. 3 is an example illustration of training on a forward prediction task.

FIG. 3 is an example illustration of training on a forward prediction task. At a given time step t, the system obtains a current observation $O_t$ and a future observation $O_{t+k}$ that characterizes a future state of the environment that is k steps after the current state, where k is a predetermined positive integer and where each "step" corresponds to an environment state transition as a result of an action performed by the agent in the environment.

The system generates, from the future observation input, a future latent representation of the future state of the environment (204). To do this, the system can process the future observation $O_{t+k}$ using a latent embedding neural network f and in accordance with current values of the parameters of the latent embedding neural network ("latent embedding parameters") to generate the future latent representation $Z_{t+k}=f(O_{t+k})$.

The system processes, using the environment representation neural network $h_f$ and in accordance with current values of the parameters of the environment representation neural network ("environment representation parameters"), the current observation input including (i) the current observation $O_t$ and (ii) a preceding action $A_{t-1}$ performed by the agent at an immediately preceding environment state to generate a current internal representation $B_t$ of the current state of the environment (206).

The system then generates a partial future internal representation $B_{t,k}$ corresponding to the future state of the environment from the current internal representation $B_t$. The system can do this by initializing the hidden state of the partial representation neural network $h_p$ using the current internal representation $B_t$, e.g., by enabling partial representation neural network to have the same hidden state as the environment representation neural network, and thereafter using the partial representation neural network $h_p$ to iteratively process data specifying a corresponding action to be performed by the agent at each environment state that is after the current state of the environment and before the future state of the environment, as described further below.

The partial representation neural network may be configured as a recurrent neural network to receive, at each time step, a partial representation network input including a current action performed by the agent in accordance with current values of the parameters of the partial representation neural network ("partial representation parameters") and to update its hidden state for the time step, i.e., to modify a current hidden state of the partial representation neural network by processing the currently received partial representation network input. Because the partial representation neural network can be used to simulate state transitions of the environment without iteratively processing additional information about the environment, e.g., an observation characterizing the state of the environment, the hidden state of the partial representation neural network can be referred to as a partial internal representation of the state of the environment, i.e., in contrast to the (full) internal representation generated by the environment representation neural network 110 from both observation and action data.

Figure 4:
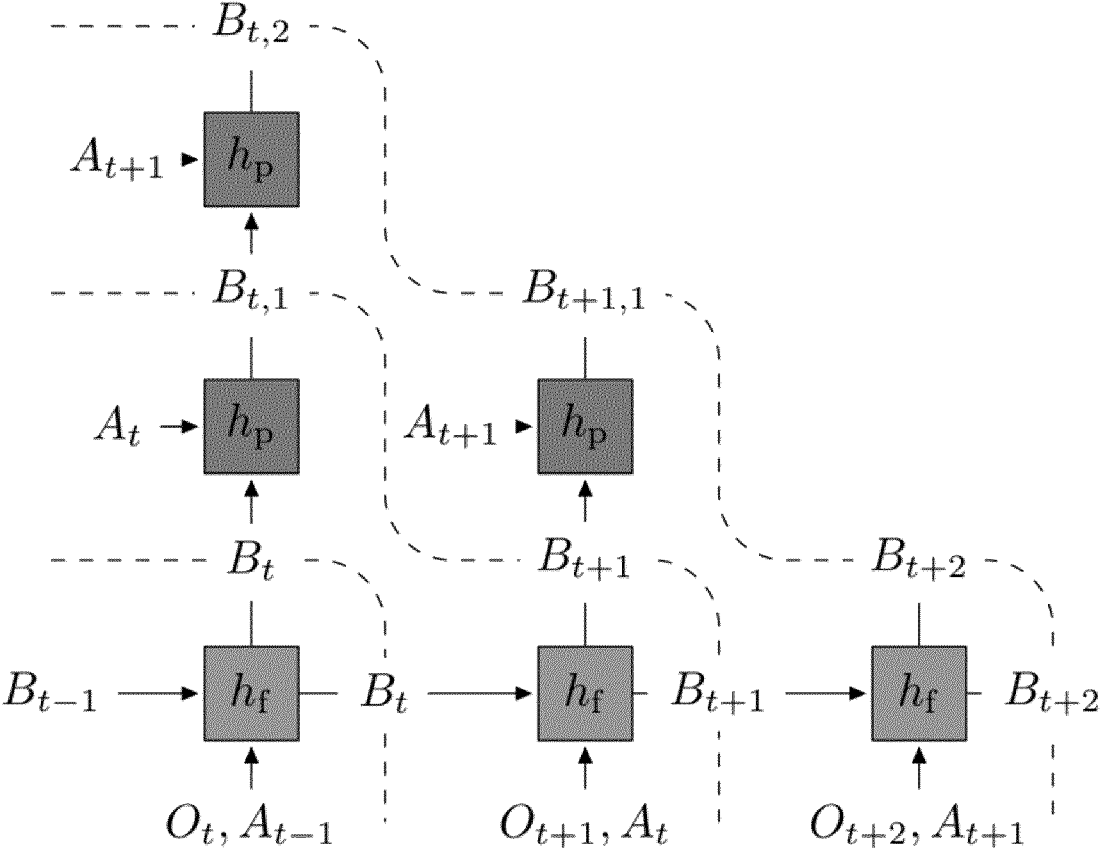
FIG. 4 is an example illustration of generating internal representations using an environment representation neural network and generating partial internal representations using a partial representation neural network.

FIG. 4 is an example illustration of generating internal representations using an environment representation neural network and generating partial internal representations using a partial representation neural network. The dashed lines in FIG. 2 connect internal representations and partial internal representations aligned in time.

At each time step, e.g., at time step t+1 (referred to below as the "current" time step), the system 100 can use the environment representation neural network $(h_f)$ to process an environment representation network input including (i) a current observation $O_{t+1}$ and (ii) a preceding action $A_t$ and to update its hidden state $B_t$ for the time step. The updated hidden state $B_{t+1}$ corresponds to an internal representation of the current state of the environment and can be mathematically computed as $B_{t+1}=h_f(B_t, O_{t+1}, A_t)$.

The updated hidden state $B_{t+1}$ (or an output generated by an output layer of the environment representation neural network from the updated hidden state) can be provided as input to an action selection policy neural network for use in generating the action selection output, or to the partial environment representation neural network, i.e., for initialization of the hidden state of the partial environment representation neural network, such that the partial environment representation neural network can thereafter generate a partial internal representation of a future state of the environment from the updated hidden state $B_{t+1}$. For example, the future state may be a state that is k steps after the current state, where k is a predetermined positive integer, and where each "step" corresponds to an environment state transition as a result of an action performed by the agent in the environment.

In the example of FIG. 4, at the time step of t+1, the system can use the partial environment representation neural network $(h_p)$ to process a previous action $A_t$ and to determine an updated hidden state $B_{t,1}$ of the partial environment representation neural network for the time step. The updated hidden state $B_{t,1}$ corresponds to a partial current internal representation of the current state of the environment.

From the partial current internal representation, the system can iteratively use the partial environment representation neural network $(h_p)$ to generate multiple partial future internal representations of the future states of the environment. At each iteration, the partial environment representation neural network $(h_p)$ receives as input data specifying a preceding action performed by the agent at an immediately preceding environment state. For example, at time step t+2 (when k=1), the system can use the partial environment representation neural network $(h_p)$ to process a previous action $A_{t+1}$ performed by the agent at time step t+1 and to determine an updated hidden state $B_{t,2}$ of the partial environment representation neural network for the time step. The updated hidden state $B_{t,2}$ corresponds to a partial future internal representation of a future state of the environment that is one step after the current state.

In mathematical terms, the updated hidden states of the partial representation neural network corresponding to a partial current internal representation and a partial future internal representation can be computed as $$B_{t,1} = h_p(B_t, A_t)$$

$$B_{t,k+1} = h_p(B_{t,k}, A_{t+k}), \text{ respectively.}$$

The system generates, from the partial future internal representation $B_{t,k}$, a predicted future latent representation that is a prediction of the future latent representation of the future state of the environment (208). To generate the predicted future latent representation, the system can provide as input the partial future internal representation $B_{t,k}$ to a forward prediction neural network g. The forward prediction neural network is configured to process the partial future internal representation $B_{t,k}$ in accordance with current values of the parameters of the forward prediction neural network ("forward prediction parameters") to generate the predicted future latent representation $g(B_{t,k})$.

The system evaluates a first auxiliary task objective function measuring a difference between the future latent representation and the predicted future latent representation (210). The first auxiliary task objective function can train the environment representation neural network to generate, from a current observation characterizing a current state of the environment, an internal representation of the current state of the environment that can effectively be used to predict latent representations of one or more future states of the environment that are after the current state of the environment.

For example, the first auxiliary task objective function can be evaluated as $$\min_{h \in H, g \in G} \sum_{t,k} \| g(B_{t,k}) - Z_{t+k} \|_2^2.$$

The system determines an update to the current values of the environment representation parameters (212). To determine the update, the system can compute a gradient of the first auxiliary task objective function with respect to the forward prediction parameters, and backpropagate the gradient to the partial representation parameters and then to the environment representation parameters. A stop-gradient operator (as denoted by the crossed arrows in FIG. 3) may be implemented by the system so as to prevent the parameter values of certain components of the system, e.g., values of the latent embedding parameters, from being updated during the training on the forward prediction task.

Figure 5:
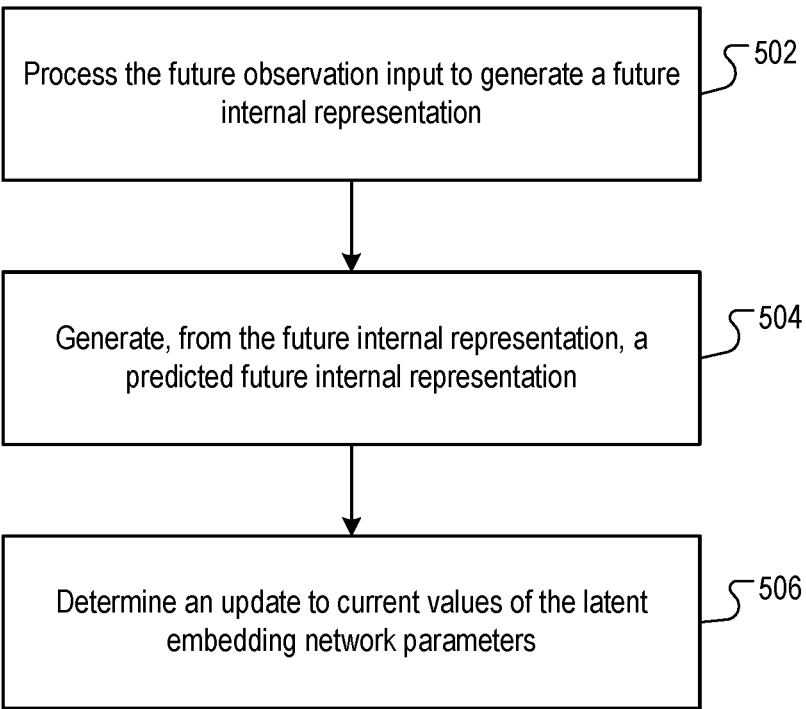
FIG. 5 is a flow diagram of an example process for training on a backward prediction task.

FIG. 5 is a flow diagram of an example process 500 for training on a backward prediction task. For convenience, the process 500 will be described as being performed by a system of one or more computers located in one or more locations. For example, a reinforcement learning system, e.g., the reinforcement learning system 100 of FIG. 1, appropriately programmed, can perform the process 500.

As similarly described above, the system can iteratively perform the process 500 by using a trajectory selected from the replay memory, e.g., the trajectory selected in process 200.

Figure 6:
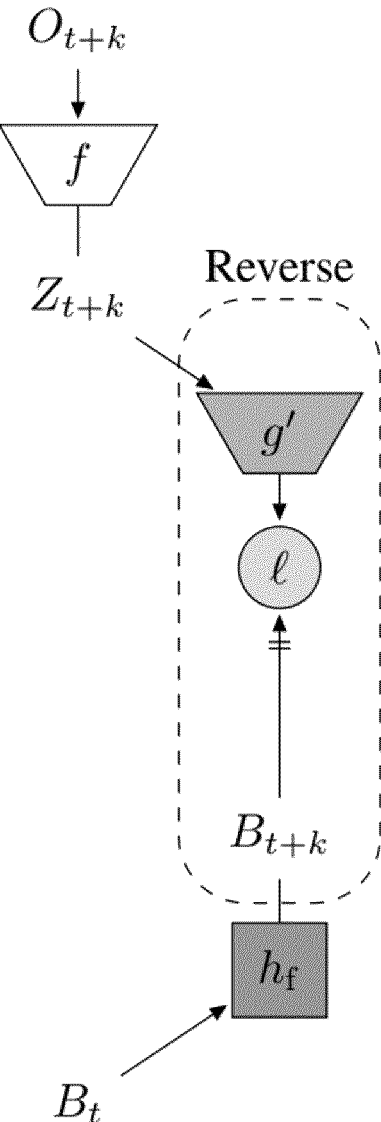
FIG. 6 is an example illustration of training on a backward prediction task.

FIG. 6 is an example illustration of training on a backward prediction task.

The system uses the environment representation neural network $h_f$ to generate a future internal representation of the future state of the environment (502). To do this, as depicted in FIG. 6, the system can process, at each of multiple time steps, an observation input including (i) the current observation $O_t$ characterizing the current state of the environment, or a future observation $O_{t+k}$ that is k step(s) after the current observation and until the future observation characterizing the future state of the environment and (ii) the preceding action $A_{t-1}$ performed by the agent in response to the current observation $O_t$, or a preceding action $A_{t+k-1}$ performed by the agent in response to an immediately preceding observation of the future observation $O_{t+k}$ using the environment representation neural network $h_f$ and in accordance with current values of the environment representation parameters to update its hidden state, e.g., to modify the current hidden state $B_{t+k-1}$ to generate an updated hidden state $B_{t+k}$. The final updated hidden state $B_{t+k}$ of the environment representation neural network corresponds to the future internal representation of the future state of the environment.

The system generates, from the future latent representation, a predicted future internal representation that is a prediction of the future internal representation of the future state of the environment (504). As described above, the future latent representation $Z_{t+k}=f(O_{t+k})$ can be generated by the latent embedding neural network f from the future observation $O_{t+k}$.

To generate the predicted future internal representation, the system can provide as input the future latent representation $Z_{t+k}$ to a backward prediction neural network g'. The backward prediction neural network is configured to process the future latent representation $Z_{t+k}$ in accordance with current values of the parameters of the backward prediction neural network ("backward prediction parameters") to generate the predicted future internal representation $g'(Z_{t+k})$.

The system evaluates a second auxiliary task objective function measuring a difference between the future internal representation and the predicted future internal representation (506). The second auxiliary task objective can train the latent embedding neural network and the backward prediction neural network to generate, from a future observation characterizing a future state of the environment that is after a current state of the environment, a predicted future internal representation that tends to match a future internal representation generated by using the environment representation neural network from a corresponding future observation input including (i) the future observation characterizing the future state of the environment and (ii) a preceding action performed by the agent at an immediately preceding state of the future state of the environment. For example, the second auxiliary task objective function can be evaluated as $$\min_{f\in F, g'\in G'} \sum_t \|g'(\overline{f(O_t)}) - B_t\|_2^2.$$

As similarly described above, the system determines, e.g., through backpropagation, an update to the current values of the latent embedding parameters and the backward prediction parameters based on computing a gradient of the second auxiliary task objective function with respect to the network parameters. A stop-gradient operator may be implemented by the system so as to prevent the values of the environment representation parameters from being updated during the training on the backward prediction task.

In some implementations, the system interleaves the forward and backward prediction training with the reinforcement learning training of the system. In brief, the reinforcement learning training of the system trains the action selection policy neural network to generate action selection outputs that maximize the expected long-term time-discounted reward received by the system, by using a reinforcement learning technique to iteratively adjust the values of the policy parameters.

The system processes a given internal representation using the action selection policy neural network in accordance with current values of the policy parameters to generate an action selection output specifying an action to be performed by the agent at a given environment state. The given internal representation can be a hidden state generated by the environment representation neural network from processing a given observation input including (i) a current observation characterizing the given environment state and (ii) a preceding action performed by the agent in response to an immediately preceding observation of the given observation.

The system determines a reinforcement learning loss based on the current action selection output and in accordance with an appropriate reinforcement learning training technique, as described above with reference to FIG. 1

The system determines an update to current values of the policy parameters by computing a gradient of the reinforcement loss with respect to the policy parameters. In some implementations, the system additionally determines an update to the current values of the environment representation parameters by backpropagating the gradient of the reinforcement learning loss into the environment representation parameters.

The system then proceeds to apply the updates determined from the reinforcement learning training and the forward and backward prediction training to the parameter values of the neural networks. This involves updating some or all of the environment representation parameters, the partial representation parameters, the policy parameters, the forward and backward prediction parameters, and the latent embedding parameters by using an appropriate gradient descent optimization methods, e.g., stochastic gradient descent, RMSprop or Adam. Alternatively, the system only proceeds to update the current values of the network parameters once the process 200 or 500 has been performed for an entire mini-batch of selected trajectories. A mini-batch generally includes a fixed number of trajectories, e.g., 8, 16, or 32. In other words, the system combines, e.g., by computing a weighted or unweighted average of, respective gradients that are determined during the fixed number of iterations of the process 200 or 500 and proceeds to update the current network parameter values based on the combined gradient.

In general, the system can repeatedly perform the process 200 and 500 until a termination criterion is reached, e.g., after the process 200 or 500 have been performed a predetermined number of times or after the gradient has converged to a specified value.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of training an environment representation neural network that has environment representation parameters and that receives an input comprising an observation characterizing a state of an environment being interacted with by an agent and generates an internal representation of the state of the environment, wherein the internal representation is used to control the agent in response to the observation, and wherein the method comprises:

receiving (i) a current observation input comprising a current observation characterizing a current state of the environment and (ii) a future observation input comprising a future observation characterizing a future state of the environment that is subsequent to the current state;

processing, using a latent embedding neural network having latent embedding network parameters, the future observation input to generate a future latent representation of the future state of the environment;

processing, using the environment representation neural network, the future observation input to generate a future internal representation of the future state of the environment;

generating, from the future latent representation, a predicted future internal representation that is a prediction of the future internal representation of the future state of the environment; and determining, based on a difference between the future internal representation and the predicted future internal representation, an update to current values of the latent embedding network parameters;

processing, using the environment representation neural network, the current observation input in accordance with current values of the environment representation parameters to generate a current internal representation of the current state of the environment;

generating, from the current internal representation, a predicted future latent representation that is a prediction of the future latent representation of the future state of the environment; and determining, based on a difference between the future latent representation and the predicted future latent representation, an update to the current values of the environment representation parameters.

2. The method of claim 1, wherein the agent is controlled using a fixed, uniformly random action selection policy.

3. The method of claim 1, further comprising:

processing the current internal representation using an action selection policy neural network having a plurality of policy parameters to generate a current action selection output specifying an action to be performed by the agent at the current state;

determining, based on the current action selection output, a reinforcement learning loss; and determining, based on the reinforcement loss, an update to current values of the policy parameters.

4. The method of claim 3, wherein determining the update to the current values of the environment representation parameters comprises:

determining the update to the current values of the environment representation parameters by backpropagating a gradient of the reinforcement learning loss into the environment representation parameters of the environment representation neural network.

5. The method of claim 1, wherein the future state is k steps after the current state, and wherein k is a predetermined positive integer.

6. The method of claim 1, wherein:

generating the predicted future latent representation that is a prediction of the future latent representation of the future state of the environment comprises processing, using a forward prediction neural network having forward prediction network parameters, a forward prediction network input that is derived from the current internal representation to generate the predicted future latent representations; and the method further comprises determining, based on computing a gradient of the objective function with respect to the forward prediction network parameters, an update to current values of the forward prediction network parameters.

7. The method of claim 6, wherein the forward prediction network input that is derived from the current internal representation is a partial future internal representation generated by a partial representation neural network.

8. The method of claim 6, further comprising:

backpropagating the computed gradient into the environment representation neural network to determine the update to the current values of the environment representation parameters.

9. The method of claim 1, wherein:

generating the predicted future internal representation comprises processing, using a backward prediction neural network having a plurality of backward prediction network parameters, the future latent representation to generate the predicted future internal representation; and the method further comprises determining an update to current values of the backward prediction network parameters.

10. The method of claim 1, wherein the current observation input further comprises a preceding action that was performed by the agent at a preceding state of the environment.

11. The method of claim 1, wherein the environment representation neural network comprises a partial representation neural network that is configured to process (i) the current internal representation and (ii) a current action that is performed by the agent to generate a partial future internal representation of the future state of the environment.

12. The method of claim 1, wherein the environment is a real-world environment and the agent is a mechanical agent interacting with the real-world environment.

13. The method of claim 12, wherein the mechanical agent is a robot.

14. The method of claim 1, wherein the environment is a simulated environment and the agent is implemented as one or more computers interacting with the simulated environment.

15. The method of claim 14, wherein the agent is a simulated vehicle.

16. A system comprising one or more computers and one or more storage devices storing instructions that are operable, when executed by the one or more computers, to cause the one or more computers to perform the operations for training an environment representation neural network that has environment representation parameters and that receives an input comprising an observation characterizing a state of an environment being interacted with by an agent and generates an internal representation of the state of the environment, wherein the internal representation is used to control the agent in response to the observation, and wherein the operations comprise:

receiving (i) a current observation input comprising a current observation characterizing a current state of the environment and (ii) a future observation input comprising a future observation characterizing a future state of the environment that is subsequent to the current state;

processing, using a latent embedding neural network having latent embedding network parameters, the future observation input to generate a future latent representation of the future state of the environment;

processing, using the environment representation neural network, the future observation input to generate a future internal representation of the future state of the environment;

generating, from the future latent representation, a predicted future internal representation that is a prediction of the future internal representation of the future state of the environment; and determining, based on a difference between the future internal representation and the predicted future internal representation, an update to current values of the latent embedding network parameters;

processing, using the environment representation neural network, the current observation input in accordance with current values of the environment representation parameters to generate a current internal representation of the current state of the environment;

generating, from the current internal representation, a predicted future latent representation that is a prediction of the future latent representation of the future state of the environment; and determining, based on a difference between the future latent representation and the predicted future latent representation, an update to the current values of the environment representation parameters.

17. The system of claim 16, wherein the agent is controlled using a fixed, uniformly random action selection policy.

18. The system of claim 16, wherein the operations further comprise:

processing the current internal representation using an action selection policy neural network having a plurality of policy parameters to generate a current action selection output specifying an action to be performed by the agent at the current state;

determining, based on the current action selection output, a reinforcement learning loss; and determining, based on the reinforcement loss, an update to current values of the policy parameters.

19. The system of claim 18, wherein determining the update to the current values of the environment representation parameters comprises:

determining the update to the current values of the environment representation parameters by backpropagating a gradient of the reinforcement learning loss into the environment representation parameters of the environment representation neural network.

20. A non-transitory computer storage medium encoded with instructions that, when executed by one or more computers, cause the one or more computers to perform the operations for training an environment representation neural network that has environment representation parameters and that receives an input comprising an observation characterizing a state of an environment being interacted with by an agent and generates an internal representation of the state of the environment, wherein the internal representation is used to control the agent in response to the observation, and wherein the operations comprise:

receiving (i) a current observation input comprising a current observation characterizing a current state of the environment and (ii) a future observation input comprising a future observation characterizing a future state of the environment that is subsequent to the current state;

processing, using a latent embedding neural network having latent embedding network parameters, the future observation input to generate a future latent representation of the future state of the environment;

processing, using the environment representation neural network, the future observation input to generate a future internal representation of the future state of the environment;

generating, from the future latent representation, a predicted future internal representation that is a prediction of the future internal representation of the future state of the environment; and determining, based on a difference between the future internal representation and the predicted future internal representation, an update to current values of the latent embedding network parameters;

processing, using the environment representation neural network, the current observation input in accordance with current values of the environment representation parameters to generate a current internal representation of the current state of the environment;

generating, from the current internal representation, a predicted future latent representation that is a prediction of the future latent representation of the future state of the environment; and determining, based on a difference between the future latent representation and the predicted future latent representation, an update to the current values of the environment representation parameters.

* * * * *